United States Patent Office 3,525,253
Patented Aug. 25, 1970

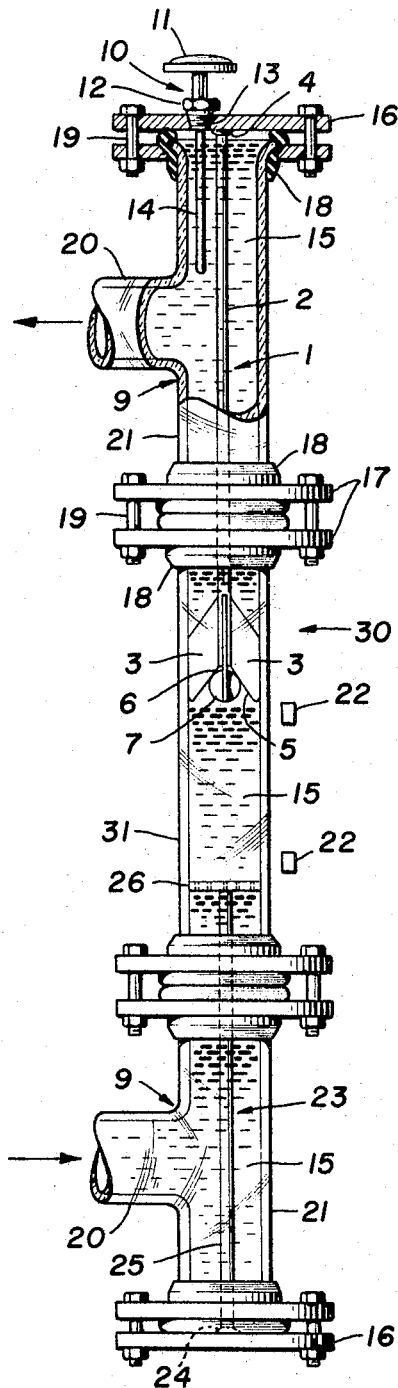

---

3,525,253
ARRESTING ELEMENTS FOR VISCOMETERS
David F. Bittle, Allen H. Farr, and Ernest A. Taylor, Jr.,
Decatur, Ala., assignors to Monsanto Company, St.
Louis, Mo., a corporation of Delaware
Continuation-in-part of application Ser. No. 677,336,
Oct. 23, 1967. This application Mar. 21, 1968, Ser. No.
709,844
Int. Cl. G01n *11/12*
U.S. Cl. 73—57            3 Claims

ABSTRACT OF THE DISCLOSURE

A vertically positioned viscometer comprising a housing having top, bottom, and side walls, a weighted detectable element therewithin, a fluid inlet adjacent the bottom walls, a limiting element disposed above the fluid inlet for maintaining the detectable element within the housing, and a positioning element disposed below the fluid outlet for maintaining the detectable element within the housing and funneling same away from the side walls.

CROSS-REFERENCES TO RELATED APPLICATIONS

This application is a continuation-in-part of U.S. patent application Ser. No. 677,336, filed Oct. 23, 1967, now abandoned.

BACKGROUND OF THE INVENTION

Field of the invention

This invention relates to an apparatus for determining viscosity, and more particularly to an apparatus wherein viscosity measurements may be accurately made either automatically or manually by determining the rate of decent of a weighted element in a static fluid and wherein the weighted element is automatically positioned away from the walls of the viscometer housing.

DESCRIPTION OF THE PRIOR ART

Heretofore, a number of types and forms of viscometers have been readily available. Their use in many industries is of utmost importance and their accuracy is of equal importance. Industrial uses include viscosity control for such operations as blending, sizing, oil bodying, printing, coating, diluting, impregnating, homogenizing dipping, fuel burning, extruding, polymerizing, spraying, cooking, pumping, etc.

There are three basic types of viscometers now in common use: (1) capillary tube, (2) rotational, and (3) falling body. The capillary tube viscometers are primarily precision laboratory instruments which are very sensitive to temperature and contamination with dust and oil. They are further restricted for the most part to measurements of Newtonian liquids in the range of 0.01 to 100 poises.

Rotational viscometers are useful over a wide range viscosities and are particularly valuable for the measurement of non-Newtonian liquids having viscosities in excess of 50 poises. The instruments are sturdy and well suited to industrial use where only moderate precision is required. However, the instruments have the disadvantage of being relatively expensive due to their precision and intricate construction. Furthermore, they are best used for single batch wise viscosity determinations and are not readily installed as an integral part of a process system.

The falling body viscometers are also useful over an extremely wide viscosity range, and will satisfactorily measure the viscosity of gases as well as heavy asphalts and tars. This type of instrument is rugged and inexpensive due to it simple construction, and although not as accurate as the capillary or rotational types, it is well suited to general industrial use.

The falling body type viscometer may be readily adapted to in-line operation. A typical commercial instrument will be comprised of a vertical cylindrical housing having partially closed ends and highly machined and polished or lapped interior which in turn encloses a magnetic cylindrical piston lapped to varying tolerances. The partially closed ends allow for fluid flow and restrict movement of the piston. The piston is raised to its uppermost position by the flow of process liquid, and the rate of fall of the piston when fluid flow is discontinued is used to determine the viscosity of the fluid within the housing. Adjacent the housing there will be located an electrically operated sensing device to determine the position of the piston.

The accuracy of such an instrument becomes questionable under operating conditions which are less than ideal. Distorted data can result for example, from misalignment of the housing which causes the piston to scrape against the walls, or from unwanted matter becoming lodged between the close fitting piston and housing. Furthermore, the close tolerances and high shear forces between the piston and housing make the unit very susceptible to temperature variations and requires compensation by additional instrumentation.

SUMMARY OF THE INVENTION

This invention overcomes the disadvantages pointed out above by providing a viscometer wherein the walls of the housing are spaced a sufficient distance from a detectable element whose rate of fall is used to determine the viscosity of the fluid within the housing, and wherein a positioning element is located within the housing for positioning the detectable element at a desired point from which the detectable element is allowed to fall.

It is therefore an object of this invention to provide a simple and inexpensive viscometer.

Another object of this invention is to provide for a positioning element to position a detectable element which is used to determine viscosity.

Further, it is an object of this invention to provide a viscometer which may be either manually or automatically operated and utilized.

These and other objects and advantages will become more readily apparent when read in conjunction with the remainder of the specification and considered along with the accompanying drawing.

BRIEF DESCRIPTION OF THE DRAWING

The drawing shows an elevation view, partially broken away, of a preferred embodiment of a viscometer according to this invention.

DESCRIPTION OF THE PREFERRED EMBODIMENTS

The viscometer shown in the drawing is arranged vertically and has a housing, generally denoted by reference numeral 30, which is made up of a vertical section 31, having T-shaped sections, generally denoted by reference numerals 9, secured to each end thereof. The T-shaped sections have vertical portions 21 and horizontal portions 20. Sections 9 and 31 of housing 30 are preferably made of glass or other suitable transparent material.

Sections 9 and 31 are secured together by means such as flanges 17 and bolts 19 which act on gaskets 18. Gaskets 18 are comprised of a resilient material which snugly fits and grasps the exterior ends of section 9 and 31. A cement or bonding agent may be applied if desired.

Gaskets 18 and flanges 17 in no way affect the interior of housing 30, for the ends of sections 9 and 31 come together and are held by the gaskets and flanges.

On the top end of housing 30 is a cover plate 16 which is secured to section 9 by means of bolts 19. An opening 13 is provided in plate 16 for insertion of a thermometer, generally denoted by reference numeral 10. Thermometer 10 shown is of the dial type with dial 11 being horizontal. The thermometer can be maintained by means of a packing nut 12 which is screwed into opening 13. The depth to which the sensitive end 14 of thermometer 10 is inserted into housing 30 is merely a matter of choice, but should be inserted a sufficient distance to obtain accurate temperature readings on the fluid within the housing. A glass thermometer or a thermocouple device may be substituted for the dial thermometer shown.

A device generally denoted by reference numeral 1, for positioning detectable element 7, is securely mounted to plate 16 at 4. Positioning element 1 is comprised of a rod 2 which extends a desired distance into housing 30. On the bottom end of rod 2 there are securely mounted a plurality of, generally a minimum of 3, radially projecting blades 3 which extend outwardly and downwardly from rod 2 and thereby form an acute angle between the bottom edge 5 of blade 3 and the longitudinal axis of rod 2. It should be pointed out that the number of blades required is arbitrary as long as a sufficient number are used to limit travel of element 7 above a desired point within housing 30. In the preferred embodiment as shown this point will be end 6 of rod 2.

Further, blades 3 should project toward and approach the interior walls of housing 30 to within sufficient limits to eliminate the possibility of element 7 becoming fouled or caught during operation. Blades 3 will act along with the flow of fluid in housing 30 to funnel element 7 to the center of the housing.

On the bottom end of housing 30 there is secured another cover plate 16 to which is securely mounted at 24 a limiting element generally denoted by reference numeral 23. Limiting element 23 is comprised of a rod 25 having mounted on the upper end thereof a perforated disc 26. Perforated disc 26 will allow for fluid flow within housing 30, but will not allow element 7 to pass through or below.

Positioned adjacent and exterior of housing 30 is at least one proximity detector 22 for determining the position of detectable element 7. When detectors are used they are positioned between the highest and lowest possible positions of element 7, or between end 6 of rod 2 and disc 26. This will usually be located in and around vertical section 31 of housing 30.

Detectable element 7 can be spherical and may be comprised of any material which is capable of being detected and may be colored a bright color for easy visual detection. Preferrably element 7 is metallic with a shiny finish, is magnetic, and spherical in shape. The weight and size of element 7 will necessarily vary with the fluid in question.

While the preferred embodiment described above utilizes blades for positioning, and a perforated disc for limiting, the detectable element, it is to be appreciated that the structure of these elements can be the same, and also can vary widely from that disclosed. In the broadest sense, both elements are arresting elements. In other words, blades could be used in the place of the perforated disc.

These arresting elements may include a cone constructed of wire mesh and be maintained in place by a rod secured to its apex or by securing the base edge or periphery to the inner walls of the housing. Further, these arresting elements may be comprised of mere wires or rods, etc., as long as their construction and cooperation will both limit and position the detectable element. In another broad sense, these arresting elements may be described as housings being substantially cone-shaped.

More specifically, the desired structure of the positioning element is one which will funnel the detectable element away from the interior walls of housing 30.

The positioning element will act in conjunction with the fluid outlet ports and will be located upstream therefrom. The limiting element will act in conjunction with the fluid inlet port and will be located downstream therefrom. The location of these elements within the viscometer will insure proper functioning.

In operation of the preferred embodiment, fluid enters horizontal portion 20 of lower T-section 9, passes throughout housing 30, and exits through horizontal portion 20 of upper T section 9. As the fluid is under pressure when flowing, it will pass through perforated disc 26 and act on element 7 which will be resting against disc 26 under static no-flow conditions. Element 7 will be carried upward with the fluid and will contact some point on positioning element 1, i.e., one or more of the bottom edges 5 of blades 3. Due to the downward and outward projections of bottom edges 5 from the axis of rod 2, element 7 will ride upwardly and toward the center of housing 30. After element 7 has attained its uppermost possible position, fluid flow may be stopped and viscosity determined.

The characteristics of the fluid involved will have a bearing on determination of the uppermost possible position of element 7. If element 7 can be seen through the fluid, the user of the viscometer may merely watch the element through the transparent walls of housing 30. If the element cannot be seen through the fluid a proximity detector 22 adjacent the uppermost position will be required for determining when to start viscosity measurements, and another detector 22 adjacent the lower most position will be required to determine when the element has completed its descent.

The rate of fall of element 7 under static conditions, whether detected visually or with detectors 22, is the basis upon which viscosity is determined. Static conditions are effected merely by shutting off the flow of fluid within housing 30.

The foregoing illustrates the essential features of the invention as well as some of the manners in which it may be practiced. Various changes and modifications may be made in practicing the invention without departing from the spirit and scope thereof.

What is claimed is:

1. A vertically positioned viscometer comprising a housing having top, bottom, and side walls, a weighted detectabe element therewithin, a fluid inlet adjacent the bottom wall, and a fluid outlet adjacent the top wall,
    (a) a limiting element disposed above the fluid inlet comprising a horizontal perforated disc mounted on one end of a rod which is mounted at its other end to the bottom wall of the housing, said limiting element acting to maintain the weighted detectable element within the housing and above the perforated disc; and
    (b) a positioning element disposed below the fluid outlet comprising at least 3 radially and downwardly extending blades which are secured to one end of a rod having a vertical longitudinal axis and maintained at a desired point within the housing and above the limiting element by the rod which is secured to the top wall of the housing by its other end; said blades approaching the side walls of the housing sufficiently close to prohibit the detectable element from ascending beyond the blades, and said blades having bottom edges acting to funnel the detectable element away from the side walls of the housing.

2. A viscometer according to claim 1 wherein the side walls of the housing are comprised of transparent material.

3. A vertically positioned viscometer comprising a housing having top, bottom, and side walls, a weighted detectable element therewithin, a fluid inlet adjacent the bottom wall, and a fluid outlet adjacent the top walls,
- (a) a limiting element disposed above the fluid inlet comprising a horizontal perforated disc, said limiting element acting to maintain the weighted detectable element within the housing and above the perforated disc; and
- (b) a positioning element disposed below the fluid outlet comprising at least 3 radially and downwardly extending blades which are maintained at a desired point within the housing and above the limiting element; said blades approaching the side walls of the housing sufficiently close to prohibit the detectable element from ascending beyond the blades, and said blades having bottom edges acting to funnel the detectable element away from the side walls of the housing.

References Cited

UNITED STATES PATENTS

| 1,997,960 | 4/1935 | Bell | 73—57 |
|---|---|---|---|
| 2,655,041 | 10/1953 | Jacobsson | 73—209 X |
| 2,778,220 | 1/1957 | Kuhlmann et al. | 73—57 |
| 3,304,765 | 2/1967 | Norcross | 73—57 |

FOREIGN PATENTS

| 467,401 | 8/1950 | Canada. |
|---|---|---|
| 611,575 | 12/1960 | Canada. |

LOUIS R. PRINCE, Primary Examiner

J. W. ROSKOS, Assistant Examiner